United States Patent [19]

Okada et al.

[11] 4,148,082
[45] Apr. 3, 1979

[54] TRACKING CONTROL APPARATUS

[75] Inventors: Hidehiko Okada, Yokohama; Minoru Morio, Tokyo; Masahiro Kambara, Tokyo; Yukio Kubota, Tokyo, all of Japan

[73] Assignee: Sony Corporation, Tokyo, Japan

[21] Appl. No.: 833,346

[22] Filed: Sep. 14, 1977

[30] Foreign Application Priority Data

Sep. 13, 1976 [JP] Japan ................................ 51-109672

[51] Int. Cl.² ............................................. G11B 5/58
[52] U.S. Cl. ............................... 360/77; 179/100.3 V; 360/70
[58] Field of Search .................. 360/77, 78, 105, 107, 360/108, 109, 70; 179/100.3 V

[56] References Cited

U.S. PATENT DOCUMENTS 3,978,521   8/1976   Langer ................................ 360/70
4,055,849   10/1977  Hickok ................................ 360/70

Primary Examiner—Jay P. Lucas
Attorney, Agent, or Firm—Lewis H. Eslinger; Alvin Sinderbrand

[57] ABSTRACT

Tracking control apparatus for a signal reproducing system of the type wherein at least one transducer scans successive parallel tracks on a record medium in which information signals, such as video signals, are recorded. The transducer preferably is of the rotary type so that, during its orbit, it is brought into and then out of reproducing relation with respect to the record medium. Any deviation between the scanning trace of the transducer across the medium and a given track which is being scanned is detected, and a control signal is produced as a function of this detected deviation. The transducer is supported by an adjustable support which is responsive to the control signal so as to displace the transducer transversely of the given track by an amount determined by the control signal. A predetermined sample of the control signal is produced while the transducer scans the given track, and this predetermined sample is stored. Prior to the time that the transducer moves into a reproducing relation with respect to the medium, the stored sample is supplied to the adjustable support so that the transducer is pre-displaced before signals are reproduced thereby.

16 Claims, 34 Drawing Figures

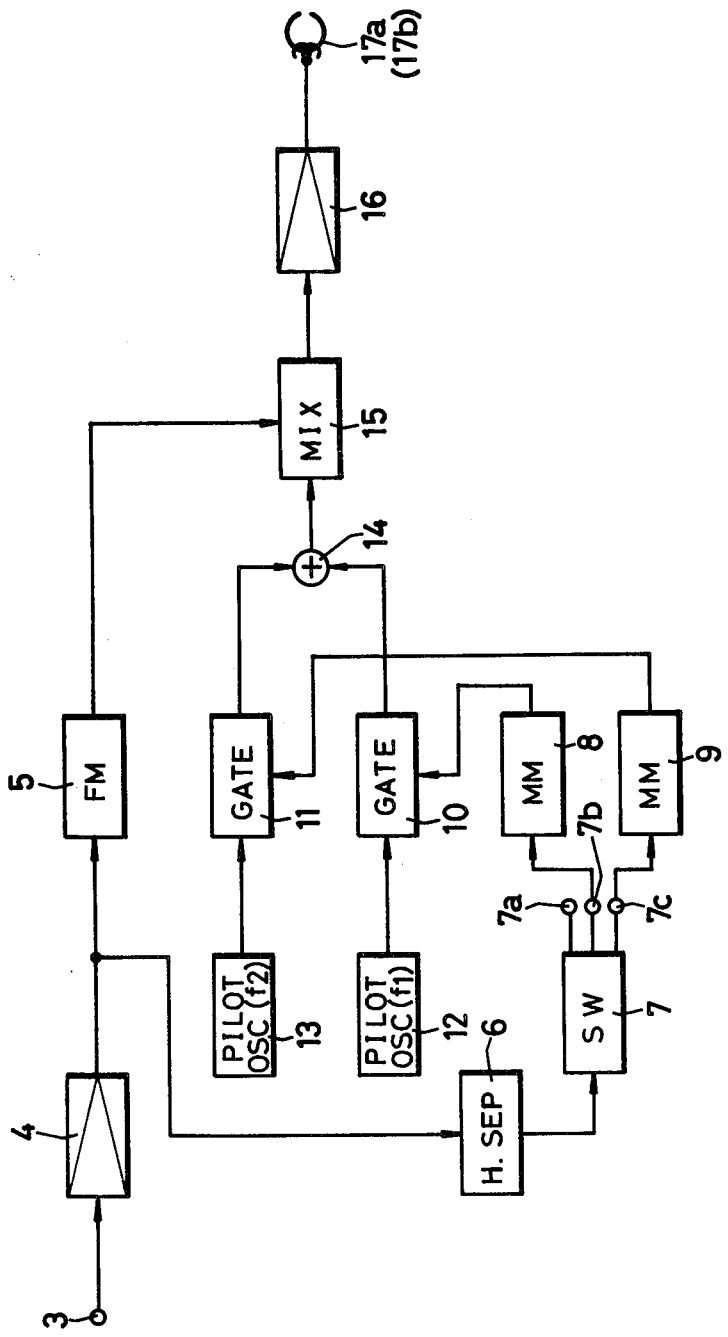

TRACKING CONTROL APPARATUS

BACKGROUND OF THE INVENTION

This invention relates to tracking control apparatus and, more particularly, to such apparatus for controlling the scanning trace of at least one transducer as that transducer scans successive parallel tracks on a record medium to reproduce information signals from such parallel tracks without deterioration or interference of such reproduced signals.

In one type of signal recording and/or reproducing apparatus, a rotary head assemby is provided with one or more heads which scan successive parallel tracks on a record medium so as to record and/or reproduce signal information in such tracks. The record medium generally used in such apparatus is magnetic tape, magnetic sheets, magnetic discs or other types of known record media. In general, while the one or more heads rotate across the record medium, the medium itself also is moved. One particular use of this type of apparatus is to record video signal information on, for example, magnetic tape wherein parallel slant tracks are recorded in skewed relation to the longitudinal axis of the tape. Rotary head recording and/or reproducing apparatus also can be used to record other types of information, such as analog signals or, if desired, digital signals. In the interest of simplification, the following explanation and description will refer to video signal recorders and, particularly, video tape recorders (VTR). However, as will be understood, this explanation and description also is applicable to other analog or digital recording/reproducing apparatus which may use magnetic tape or which may use different record media.

A typical VTR includes one, and preferably two, record and/or playback heads mounted on a suitable rotary assembly so as to rotatably scan a magnetic tape which is helically wrapped about at least a portion of guide drum. During recording, a tracking servo system synchronizes the movement of the tape to the rotary movement of the heads, and control signals which can be used for this type of synchronism during a reproducing operation are recorded on the tape. During reproduction, the same or a similar servo control system is used to synchronize the movement of the tape to the rotation of the heads in accordance with the control signals which had been recorded. Consequently, an accurate video picture can be displayed in response to the reproduced video signal. This accuracy is, in large part, due to the fact that servo control system tends to control the relative movement between the rotary heads and tape such that each head scans substantially the same track during a reproducing operation as was scanned during the recording operation.

However, even with this servo control system, there are instances when the path traversed by the heads during reproduction does not coincide satisfactorily with the previously recorded record track. This problem of a deivation or error in the scanning trce of the reproducing head is present particularly when the video signals are recorded by one VTR and are reproduced by a different VTR. If the orbits of the magnetic heads in these different VTR's are not equal to each other, the servo control system may not be effective to bring the heads into precise coincidence with the recorded tracks during reproduction. Other factors also may be present which prevent successful operation of the servo control system.

The aforementioned tracking errors, or scanning deviation, may not be particularly noticeable or objectionable for a VTR wherein guard bands are used to separate adjacent parallel tracks, or when the magnetic tape is transported at a sufficiently high speed. However, if the guard bands between adjacent tracks are reduced, or eliminated, and if the speed at which the magnetic tape is transported is reduced, the effect of tracking errors during a signal reproducing operation may result in deterioration or interference of the reproduced video picture which is not acceptable. It is desirable to minimize or eliminate the guard band, and thus increase the recording density (tracks per inch). and it also is desirable to reduce the transport speed of the magnetic tape so as to increase the amount of video signal information which can be recorded on a magnetic tape of given length. By thus increasing the recording capacity (usually expressed as a measure of time) of the VTR, there need not be a concommitent increase in the supply or length of recording tape. However, for these "long-playing" VTR's, the effect of tracking errors is to reduce the signal-to-noise ratio and, moreover, such errors otherwise deleteriously affect the reproducing characteristics of the VTR.

It is thought that tracking errors of the type wherein a scanning head deviates from the prerecorded track may be corrected by sensing such deviation and by adjusting the position of the head relative to the scanned track so as to minimize such error. If the head is mounted on an adjustable support assembly, and if tracking errors, or deviations, are detected by sensing a corss-talk signal picked up by the head from an adjacent track, then the cross-talk signal can be used to derive a control signal which, in turn, drives the adjustable head support assembly in a direction to bring the head into proper coincidence with the record track, and thus reduce the level of the cross-talk signal. However, with this type of control technique, the head is brought into its correct scanning trace only after a portion of the track has been scanned thereby. This means that a tracking error will exist while the initial portion of the track is scanned, thereby resulting in an undesirable effect upon the first few lines of the reproduced video picture. Since the control signal which is used to properly position the head as it scans the record track is removed or terminated after the head completes its trace, the head returns to its non-controlled position whereat it remains until it is brought into contact with the record medium so as to scan the next track. Hence, there is a need to substantially eliminate the delay in bringing the head into proper position during its trace of a record track. Stated otherwise, there is a need to minimize the time required to displace the head from its non-controlled position to its proper position while scanning the record medium.

OBJECT OF THE INVENTION

Therefore, it is an object of the present invention to provided improved tracking control apparatus which overcomes the aforenoted problems and which brings a scanning head into proper position relative to a record track such that the scanning path of the head coincides with that track.

Another object of this invention is to provide tracking control apparatus wherein tracking errors or deviations between a scanning transducer and a record track are minimized.

A further object of this invention is to provide tracking control apparatus wherein one or more rotary heads scan adjacent parallel record tracks and wherein each head is controlled to traverse a scanning path which coincides with the record tracks even during the initial portions of each record track.

An additional object of this invention is to provide tracking control apparatus wherein the rotary head scans parallel record tracks and wherein the head is controlled during the interval that it does not scan a record track such that it nearly is aligned correctly with the next record track to be scanned thereby.

Yet another object of this invention is to provide tracking control apparatus for minimizing tracking errors of a scanning head which traverses a scanning path that may deviate from a desired path, this deviation being compensated by displacing the support member from which the head is mounted even before the head commences its scanning path.

A still further object of this invention is to provide tracking control apparatus for minimizing tracking errors of reproducing transducers in, for example, a long-playing video record and/or playback system.

Another object of this invention is to provide tracking control apparatus for use in, for example, a video reproducing system wherein at least one transducer reproduces video signals which are recorded, together with pilot signals, in parallel record tracks, and wherein the scanning trace of the transducers is controlled in response to the reproduced pilot signals so as to rapidly coincide with the record tracks without "hunting" thereabout.

Various other objects, advantages and features of the present invention will become readily apparent from the ensuing detailed description, and the novel features will be particularly pointed out in the appended claims.

SUMMARY OF THE INVENTION

In accordance with this invention, tracking control apparatus is provided for a signal reproducing system of the type wherein at least one transducer scans successive parallel tracks on a record medium in which information signals are recorded. Any deviation between the scanning trace of the transducer, which is adapted to be moved into a reproducing relation with respect to the record medium, and the track which is being scanned is detected and a control signal, produced as a function of this detected deivation, is applied to an adjustable transducer support so as to displace the transducer and thereby eliminate the deviation. A predetermined sample of the control signal is produced while the tranducer scans a track, and this sample is stored and then supplied to the adjustable transducer support prior to the time that the transducer moves into its reproducing relation with respect to the record medium. Thus, the transducer is pre-displaced even before any signals are reproduced thereby. Consequently, at the start of a scanning trace, the transducer nearly is in precise alignment with the track to be scanned.

BRIEF DESCRIPTION OF THE DRAWINGS

The following detailed description, given by way of example, will best be understood in conjunction with the accompanying drawings in which:

FIG. 3 is a block diagram of video signal recording apparatus which can be used to record tracking-error correcting pilot signals of the type shown in FIG. 1;

FIGS. 8A–8E waveform diagrams which are useful in understanding the operation of the apparatus shown in FIG. 5;

FIGS. 11A–11P are waveform diagrams which are useful in understanding the operation of the apparatus shown in FIG. 10.

DETAILED DESCRIPTION OF CERTAIN PREFERRED EMBODIMENTS

In order to simplify the following description, and to facilitate an understanding of the advantages achieved by the present invention, the apparatus, features and techniques described herein are set forth in the environment of a video signal recorder and, more particularly, in the enviroment of a VTR. However, it will be apparent that the present invention can be used in other types of signal recording and/or reproducing apparatus, such as analog or digital apparatus, wherein the record medium is scanned by one or more moving heads. Furthermore, while the described record medium is, illustratively, magnetic tape, it should be readily apparent that other types of record media, such as magnetic or non-magnetic sheets, discs, and the like can be used.

Figure 1:
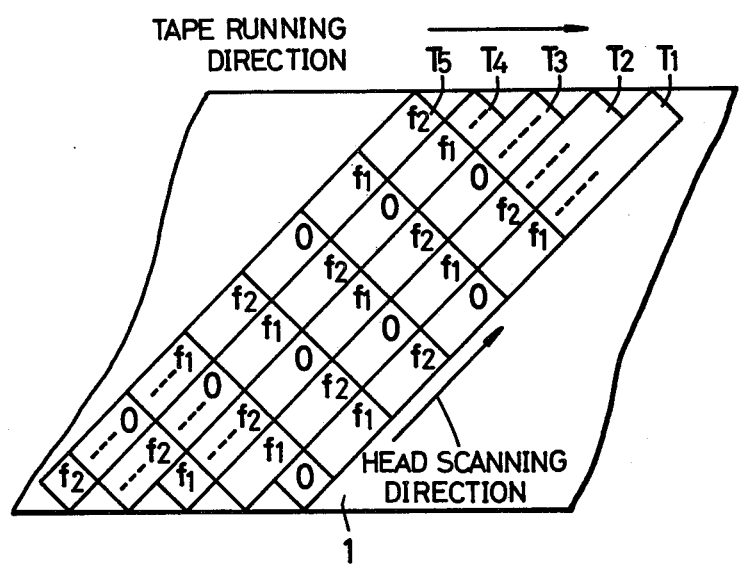
FIG. 1 represents parallel tracks on a record medium wherein successive tracks are adjacent each other and wherein particular pilot signals are recorded in the tracks.

Turning now to FIG. 1, there is illustrated a pattern of successive, adjacent parallel tracks $T_1, T_2, T_3, \ldots$ which are recorded by a recording transducer as that transducer makes successive scans across a magnetic tape 1. The direction in which the head scans the tape as well as the direction in which the tape is transporated are as indicated. Since it is assumed that the recording apparatus (not shown) is adapted to record video signals, each track contains such video signals which are formed of a plurality of horizontal line intervals. Typically, a complete field of video signals is recorded in each track.

During a reproducing operation, one or more transducers scan parallel record tracks $T_1, T_2, \ldots$ so as to reproduce the previously recorded video signals. The servo control system mentioned above is operative to adjust the relative speed of tape 1 and the transducers such that the scanning path traversed by the transducers substantially coincides with the respective record tracks. However, the operation of the servo control system may not be sufficient to achieve precise coincidence between the scanning paths and the record tracks. Assuming that each transducer is a magnetic head having a gap whose length is wider than the width of each record track $T_1, T_2 \ldots$, then if the parallel record tracks are adjacent each other, as shown, a cross-talk component will be picked up from an adjacent track when the head scans a given track. For example, if the head scans track $T_2$, a cross-talk component will be picked up from that portion of track $T_3$ which is scanned by the head, and a cross-talk component will be picked up from that portion of track $T_1$ which also is scanned by the head. If the respective cross-talk components are of substantially equal signal levels, then known techniques can be used to avoid undesired influences due to these crosstalk signals. However, if the scanning trace of the head deviates significantly from the track being scanned, the cross-talk signals picked up from track $T_1$ may not necessarily have the same signal level as the cross-talk signals picked up from track $T_3$, and the cross-talk may interfere with the video picture which ultimately is reproduced. Also, tracking errors of this type may reduce the signal-to-noise ratio, thus further interfering with the quality of the reproduced video picture.

Figure 2:
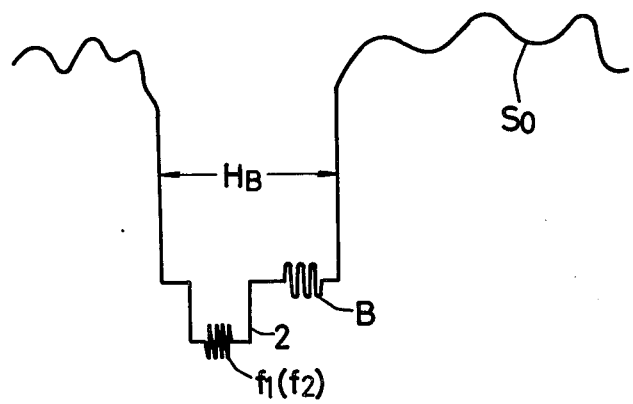
FIG. 2 is a waveform diagram of a portion of a video signal showing the relative location in the video signal at which the pilot signal is recorded.

Since the usual servo control system provided with VTR's of the type capable of recording and reproducing video signals in the tracks shown in FIG. 1 may not be capable of controlling the scanning trace of the head or heads so that this trace coincides precisely with the track being scanned, it may be necessary to provide apparatus for detecting tracking errors during a reproducing operation and for adjusting the position of the head so as to minimize such errors. For this purpose, predetermined signals, such as pilot signals, are recorded at predetermined locations in each track, these pilot signals being used to detect a tracking error during signal reproduction. In order to avoid interference between these pilot signals and the video information signals in each horizontal line interval, it is preferred that the pilot signals be recorded at predetermined locations in the horizontal blanking intervals which separate successive horizontal line intervals. More particularly, and with reference to FIG. 2, if a video signal is represented by the waveform $S_o$, the usual horizontal blanking interval $H_B$ is provided with a horizontal synchronizing pulse 2 and, for color video signals, a burst signal B provided on the back porch of the horizongal synchronizing signal. Preferably, a pilot signal is recorded during some portion of the horizontal synchronizing pulse 2. This pilot signal has a frequency which, as will be described, is changed from one horizontal blanking interval to the next. As shown in FIG. 1, the frequency of this pilot signal may be zero, $f_1$ or $f_2$. If the parallel tracks are recorded in the so-called H-alignment wherein the horizontal blanking intervals in one track are aligned with the horizontal blanking intervals in adjacent tracks, then the pilot signal is recorded, in successive order, with the frequency aero, $f_1$, $f_2$, zero, $f_1$, $f_2$, ... in track $T_1$, and then in track $T_2$, and so on. Furthermore, the frequency of the pilot signal recorded in the horizontal blanking interval of one track differs from the frequency of the pilot signal recorded in the adjacent horizontal blanking intervals in both adjacent tracks. For example, if the pilot frequency zero is recorded in one horizontal blanking interval in track $T_2$, the adjacent horizontal blanking interval in track $T_1$ is provided with a pilot signal whose frequency is $f_2$ and the adjacent horizontal blanking interval in track $T_3$ is provided with a pilot signal whose frequency is $f_1$. If the next horizontal blanking interval recorded in track $T_2$ is provided with a pilot signal whose frequency is $f_1$, then the adjacent horizontal blanking interval in track $T_1$ is provided with a pilot signal whose frequency is zero and the adjacent horizontal blanking interval in track $T_3$ is provided with a pilot signal whose frequency is $f_2$. Thus, frequencies zero, $f_1$ and $f_2$ are recorded in order and repetitively in successive horizontal blanking intervals in each track with the frequency of the pilot signal recorded in a horizontal blanking interval in one track being different from each of the frequencies of the pilot signals recorded in the adjacent horizontal blanking interval of each of the adjacent tracks.

One embodiment of apparatus which can be used to record the video signals having pilot signals of frequencies zero, $f_1$ and $f_2$ so as to record such pilot signals in the order illustrated in FIG. 1 is shown in FIG. 3. This recording apparatus includes an input terminal 3 adapted to receive a video signal, such as a composite color video signal. An amplifier 4 is coupled to input terminal 3 to amplify the video signal and video signal processing apparatus is coupled to the output of amplifier 4 so as to apply a processed video signal to a recording head 17a or 17b. As one example of suitable video signal processing apparatus, frequency modulating circuit 5 may be provided to frequency modulate the entire video signal. As an alternative embodiment of video signal processing apparatus, separate luminance and chrominance channels may be provided, wherein the luminance channel is operative to frequency modulate the luminance signals to a higher frequency band and the chrominance channel is operative to frequency convert the chrominance signals to a lower frequency band, the frequency-modulated luminance signals being combined with the frequency-converted chrominance signals for simultaneous recording. In either embodiment, it will be assumed that the processed video signal is supplied through a mixer 15 and an amplifier 16 to heads 17a, 17b. As will be discussed below, heads 17a, 17b are mounted on a rotary assembly so as to rotatably scan successive parallel record tracks across tape 1.

The pilot signal generating apparatus is comprised of a horizontal synchronizing separator circuit 6, a switching circuit 7, monostable multivibrators 8 and 9, gate circuits 10 and 11, pilot signal oscillators 12 and 13 and a combining, or adding circuit 14. Horizontal synchronizing separator circuit 6 may be of conventional construction and is adapted to separate the horizontal synchronizing signal, shown in FIG. 2, from the video signal $S_o$. Accordingly, horizontal synchronizing separator circuit 6 is coupled to amplifier 4.

Switching circuit 7 is coupled to horizontal synchronizing separator circuit 6 and includes a plurality of output terminals, for example, three output terminals 7a, 7b and 7c. This switching circuit is adapted to produce an output signal at one of its output terminals, this output signal being shifted from one to the next output terminal in response to each separated horizontal synchronizing pulse applied to the switching circuit. One example of such a switching circuit is a ring counter. Accordingly switching circuit 7 is adapted to provide an output signal at, for example, output terminal 7a, this output signal being transferred, or shifted to output terminal 7b in response to the next horizontal synchronizing pulse, and then to output terminal 7c in response to the following horizontal synchronizing pulse and then back to output terminal 7a in response to the next horizontal synchronizing pulse. Output terminals 7b and 7c are coupled to monostable multivibrators 8 and 9, respectively. For a purpose soon to become apparent, output terminal 7a is not coupled to a monostable multivibrator. Accordingly, when an output signal is shifted to output terminal 7b, monostable multivibrator 8 is triggered to produce an output pulse of predetermined duration, hereinafter a gate pulse. Similarly, when the output signal produced by switching circuit 7 is shifted to output terminal 7c, monostable multivibrator 9 is triggered to produce a gate pulse. The outputs of monostable multivibrators 8 and 9 are coupled to gate circuits 10 and 11.

Pilot signal oscillators 12 and 13 may be any conventional oscillator adapted to produce pilot signals having frequencies $f_1$, $f_2$, respectively. These respective pilot signals are adapted to be supplied to gate circuits 10 and 11. The outputs of these gate circuits are coupled to combining, or adding circuit 14, and the output of this combining or adding circuit is coupled to mixing circuit 15 whereat gated pilot signals, as will be described, are mixed or combined with the processes video signal.

To best appreciate the operation of the apparatus shown in FIG. 3, let it be assumed that head 17a records a field of video signals in track $T_1$. Accordingly, during the first horizontal blanking interval included in this field of video signals, the horizontal synchronizing signal is separated by horizontal synchronizing separator circuit 6 so as to actuate switching circuit 7 to produce the output signal at output terminal 7a. Since this output terminal is not connected to a monostable multivibrator, and since neither output terminal 7b nor output terminal 7c is supplied with the output signal from switching circuit 7, gate circuits 10 and 11 both remain de-energized. Hence, no pilot signal is recorded during the horizontal synchronizing pulse interval in the first horizontal blanking interval of the video signals recorded in track $T_1$. Stated otherwise, a pilot signal of zero frequency is recorded in the first horizontal blanking interval.

When the next horizontal blanking interval is present, the horizontal synchronizing pulse separated by horizontal synchronizing separator circuit 6 actuates switching circuit 7 to shift the output signal from output terminal 7a to output terminal 7b, thereby triggering monostable multivibrator 8 to supply a gate pulse to gate circuit 10. Consequently, this gate circuit is energized for a brief duration to supply a pilot signal whose frequency is $f_1$ through adding circuit 14, mixing circuit 15 and amplifier 16 to head 17a. Hence, a pilot signal of frequency $f_1$ is recorded during the horizontal synchronizing pulse interval of the second horizontal blanking interval.

When the third horizontal blanking interval is present in the video signals which are being recorded, the horizontal synchronizing pulse separated therefrom by horizontal synchronizing separator circuit 6 energizes switching circuit 7 to shift the output signal from output terminal 7b to output terminal 7c, thereby triggering monostable multivibrator 9 to supply a gate pulse to gate circuit 11. Hence, a pilot signal of frequency $f_2$ is supplied through gate circuit 11, adding circuit 14, mixing circuit 15 and amplifier 16 to head 17a for recording during the horizontal synchronizing pulse interval of the third horizontal blanking interval.

When the next horizontal blanking interval is present, switching circuit 7 is energized in the manner described above so as to shift the output signal from output terminal 7c to output terminal 7a. Thus, in the fourth horizontal blanking interval, a pilot signal of zero frequency is recorded. The foregoing operation is repeated cyclically such that, in general, the zero frequency pilot signal is recorded during each $(3n-2)$th horizontal blanking interval, the pilot signal of frequency $f_1$ is recorded during each $(3n-1)$th horizontal blanking interval and the pilot signal of frequency $f_2$ is recorded during each 3n-th horizontal blanking interval, wherein n is any integer. If the video signals are assumed to comply with the NTSC system wherein each field is formed of 262.5 horizontal line intervals, then the successively repetitive cycle of three different frequencies (zero, $f_1$, $f_2$) in each track will be staggered with respect to each other. That is, the frequency of the pilot signal recorded in a horizontal blanking interval in one track will differ from each of the pilot signal frequencies recorded in the adjacent horizontal blanking interval of each of the adjacent tracks. This is shown in FIG. 1 wherein each track is provided with the repetitive pilot frequency cycle zero, $f_1$, $f_2$, and wherein the pilot frequency in the horizontal blanking interval in one track differs from the pilot signal frequencies which are recorded in the adjacent horizontal blanking intervals in the adjacent tracks.

As one example, frequencies $f_1$ and $f_2$ may be 300 KHz and 600 KHz, respectively. In an alternative embodiment, track $T_1$ may be provided with a pilot signal whose frequency is the same in all horizontal blanking intervals, for example, frequency $f_1$; track $T_2$ may be provided with a pilot signal whose frequency is the same for all horizontal blanking intervals, such as frequency $f_2$, and track $T_3$ may be provided with a pilot signal whose frequency is the same in all horizontal blanking intervals, such as frequency $f_3$. These pilot signal frequencies may repeat cyclically in the further adjacent tracks. Thus, tracks $T_1$, $T_4$, ... may be provided with pilot signals of frequency $f_1$; tracks $T_2$, $T_5$, ... may be provided with pilot signals of frequency $f_2$; and tracks $T_3$, $T_6$, ... may be provided with pilot signals of frequency $f_3$. However, the illustrated cyclical repetition of different pilot frequencies in each track, as shown in FIG. 1, is preferred. The reason for this will best be understood when the reproducing apparatus is described in detail hereinbelow.

Figure 4A:
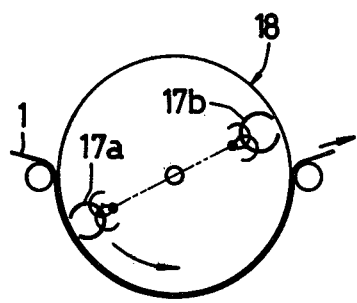
FIG. 4A is a schematic top view of rotary head recording/reproducing apparatus.

As mentioned previously, heads 17a and 17b are adapted to be mounted on a rotary support assembly so that these heads scan alternate tracks across tape 1. A schematic illustration of a top view of a typical rotary head scanning device is shown in FIG. 4A wherein two heads 17a, 17b, which are magnetic record and/or playback heads, are supported for rotation about a central axis. A guide drum 18 is adapted to receive tape 1 wrapped helically thereabout for at least 180°. Heads 17a and 17b may be mounted on diametrically opposed arms which are rotated so as to scan successive parallel, skewed tracks across tape 1. Alternatively, heads 17a and 17b may be mounted on a portion of the guide drum, which portion is adapted to be rotated so as to serve the dual purpose of guiding tape 1 thereabout and rotating heads 17a and 17b so as to scan parallel tracks across the tape. Thus, the heads rotate in the direction indicated by the arrow while tape 1 is advanced so as to have signal information recorded thereon.

Figure 4B:
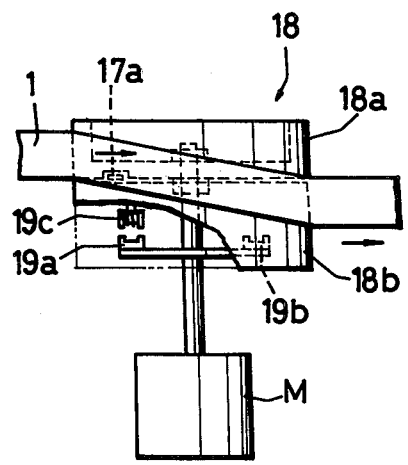
FIG. 4B is a schematic side view of the apparatus shown in FIG. 1.

If, as shown in FIG. 4B, guide drum 18 is formed of two drums 18a, 18b, disposed in face-to-face configuration and spaced apart so as to define a scanning gap therebetween, tape 1 is helically wrapped about a portion of the surface of the guide drum and heads 17a, 17b which are supported by, for example, drum 18a, are rotated to scan parallel tracks across the tape. Although FIG. 4A shows the preferred scanning apparatus wherein two heads are used, it is possible that only a single head may be provided. Nevertheless, if two heads are used, alternate tracks are recorded thereby such that first one track is recorded by head 17a and then the next adjacent track is recorded by head 17b and then the following track is recorded by head 17a, and so on.

During a signal reproducing operation, the relative speed of tape 1 with respect to heads 17a and 17b is, in many instances, intended to be the same as during a signal recording operation. A suitable servo control system (not shown) is provided to account for relatively small changes in tape-drive and head-drive motor speeds, tape shrinkage, tape stretching, differences from the recording apparatus to the reproducing apparatus, and the like. To this effect, a head-position generator 19c is provided to generate pulses when heads 17a, 17b are rotated by motor M into predetermined positions, such as when head 17a first contacts tape 1 and then when head 17b first contacts tape 1. Magnetic elements 19a, 19b are secured to the rotary drive shaft which is used to rotate heads 17a, 17b so as to rotate relative to head-position generator 19c while the heads rotate. Head-position generator 19c may comprise a magnetic pick-up sensor for generating a position detecting pulse when magnetic elements 19a, 19b rotate therepast. In a typical video recording device, each head records a complete field in a respective record track, and heads 17a, 17b are rotated at a speed of 30 rps. Consequently, the position detecting pulses generated by head-position generator 5 in response to the two magnetic elements 19a, 19b have a frequency of 60 Hz, each position-detecting pulse representing the beginning of a scanning trace, or the start of a field of video signals recorded on tape 1.

Figure 5:
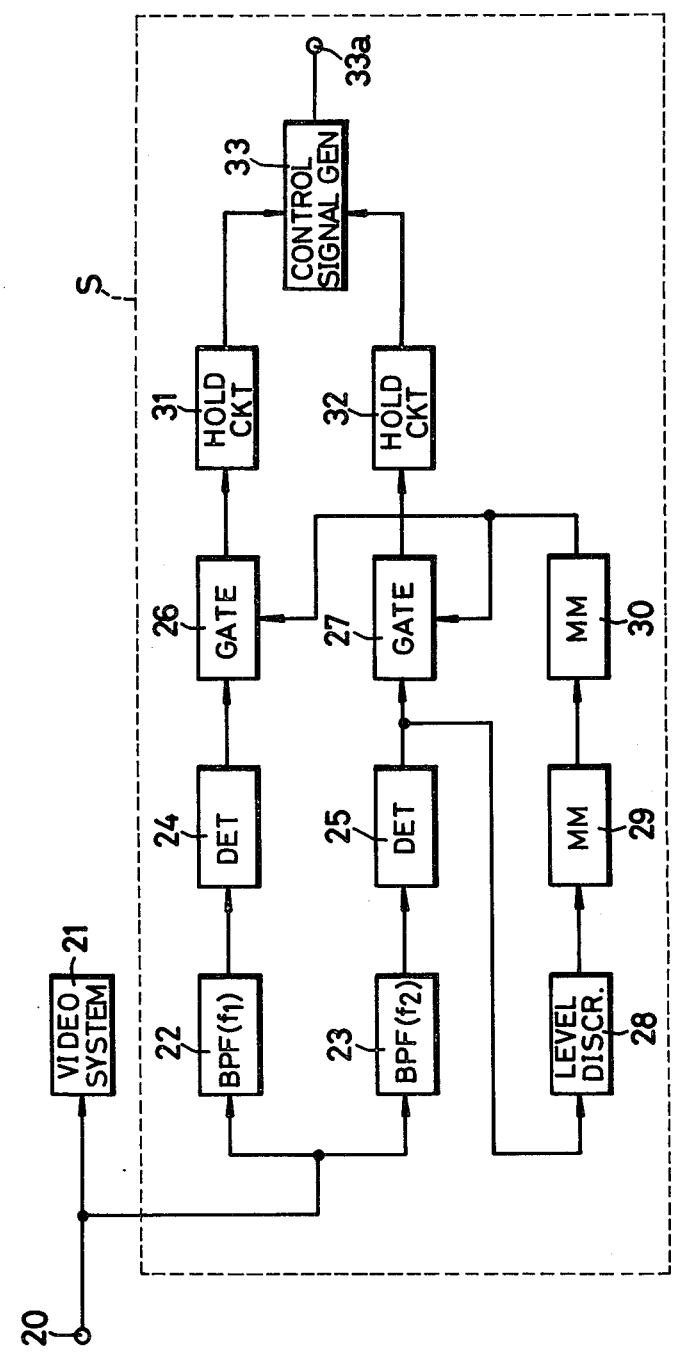
FIG. 5 is a block diagram of video signal reproducing apparatus which can be used to reproduce and utilize the pilot signals which are recorded by the apparatus shown in FIG. 3.

An embodiment of apparatus for reproducing the video signals and the pilot signals which are recorded on tape 1, in the manner shown in FIG. 1, by the apparatus described with respect to FIG. 3 now will be described in conjunction with FIG. 5. An input terminal 20 is adapted to be coupled to heads 17a, 17b so as to receive the signals which are reproduced by these heads during successive scanning traces thereby. A video processing system 21 is coupled to input terminal 20 and is adapted to be compatible with the video processing system used in the recording apparatus shown in FIG. 3. Thus, if the entire composite video signal is frequency-modulated prior to recording, video system 21 includes a compatible frequency demodulator. Similarly, if the video processing system used in the recording section includes separate luminance and chrominance channels, video system 21 likewise includes compatible luminance and chrominance channels whereby the frequency modulated luminance signal and the frequency converted chrominance signal are recovered.

In addition, a tracking control circuit S is comprised of band-pass filters 22, 23, level detectors 24, 25, gate circuits 26, 27, storage or hold circuits 31, 32, a control signal generator 33, a level discriminator 28 and monostable multivibrators 29 and 30. Band-pass filters 22 and 23 are connected in common to input terminal 20 and are tuned to pass pilot signals having frequencies $f_1$ and $f_2$, respectively. These band-pass filters may be of conventional construction and are further coupled to level detectors 24 and 25. These level detectors likewise may be of conventional construction, and are adapted to detect the signal level of the signals passed by band-pass filters 22 and 23, respectively. Accordingly, level detectors 24 and 25 may comprise envelope detectors, peak-level detectors, or the like. The outputs of level detectors 24 and 25 are coupled to gate circuits 26 and 27, respectively, and are adapted to be selectively gated thereby such that signals which are related to the reproduced pilot signal levels are transmitted through these gate circuits.

The output of level detector 25, which is adapted to detect the signal level of the pilot signal whose frequency is $f_2$, is further coupled to a level discriminator 28. This level discriminator functions as a threshold detector to produce an output signal when the level-detected signal produced by level detector 25 exceeds a predetermined threshold level. The output of level discriminator 28 is coupled to a monostable multivibrator 29 whose output is, in turn, coupled to another monostable multivibrator 30. This last-mentioned monostable multivibrator is adapted to produce gate pulses of predetermined duration, which gate pulses are supplied in common to gate circuits 26 and 27. The outputs of gate circuits 26 and 27 are coupled to storage, or hold circuits 31 and 32, respectively, these circuits being coupled to respective input terminals of control signal generator 33. Hold circuits 31 and 32 may comprise conventional storage circuits, such as capacitors, for maintaining a voltage supplied thereto by the respective gate circuits. Control signal generator 33 may comprise a comparator circuit which is adapted to compare the signal levels of the signals stored by hold circuits 31 and 32, respectively, and to produce an output voltage in accordance with the difference between these stored signals. Accordingly, control signal generator 33 may include a differential amplifier having a pair of inputs adapted to receive these stored signals. The output of control signal generator 33 is used as a drive or deflection voltage V for correspondingly adjusting an adjustable head support assembly, described below. At this stage in the specification, it may be sufficient merely to state that, depending upon the magnitude and polarity of the drive voltage V, head 17a or 17b is displaced transversely of tracks $T_1$, $T_2$, . . . so as to modify it scanning trace.

Figure 6A:
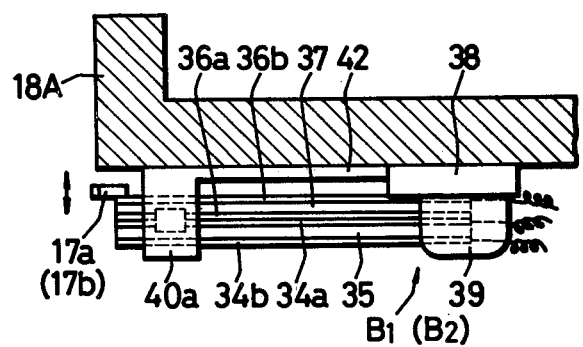
FIGS. 6A and 6B are side and bottom views of one embodiment of a head support assembly which can be used with the present invention.
Figure 6B:
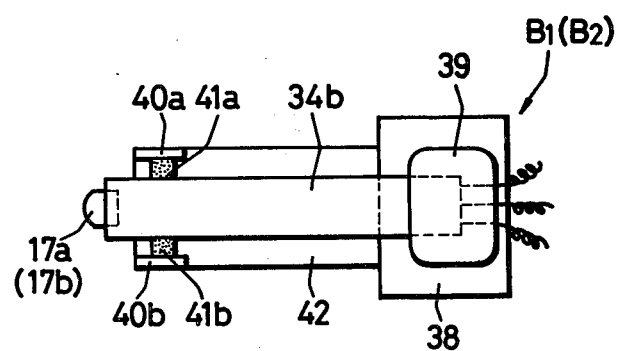
Figure 7A:
FIGS. 7A–7C are schematic side views of a piezoelectric support member which can be used with the present invention.

Before proceeding with a discussion of the operation of the apparatus shown in FIG. 5, a preferred embodiment of the adjustable head support assembly first will be described. This assembly is shown in FIGS. 6A and 6B which are side and bottom views, respectively. In FIG. 6A, it is assumed that the head support assembly is mounted on the lower surface of upper, rotatable guide drum 18a (FIG. 4B). The head support assembly includes a mounting base 39 adapted to receive electrically-responsive flexure members 35, 37 upon which head 17a (or 17b) is mounted. These flexure members are shown more particularly in FIGS. 7A-7C.

Electrically-responsive flexure members 35 and 37 are formed of piezo-electric material which is responsive to a voltage applied thereto so as to bend or deflect in a direction and to a degree that is determined by the applied voltage. Thus, when heads 17a and 17b are supported by this piezo-electric material, the controlled deflection thereof can be used to compensate for the aforementioned tracking errors.

Figure 7B:
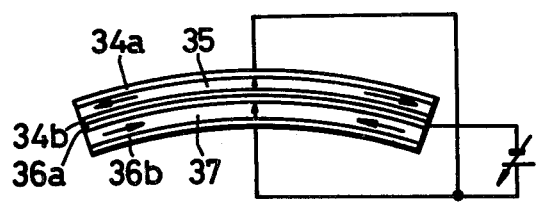

Flexure members 35 and 37 are leaf members, each being constructed of piezo-electric material whose directions of polarization are represented by the illustrated arrows. The opposite surfaces of piezo-electric leaf members 35 are plated with electrodes 34a and 34b, respectively; and the opposite surfaces of piezo-electric leaf member 37 likewise are plated with electrodes 36a and 36b, respectively. When piezo-electric leaf members 35 and 37 overlie each other such that electrodes 34b 36a are in contact, the assembly will deflect if a variable voltage is applied across the respective members. For example, and as shown in FIG. 7B, if voltages are applied to the electrodes in the manner shown, then piezo-electric leaf member 35 tends to expand in its lengthwise direction while piezo-electric leaf member 37 tends to compress. As a result of these oppositely-acting forces, the illustrated head support assembly bends, or deflects, by an amount which is a function of the strength of the electric field applied across each member. The variable voltage source thus represents that a variable electric field can be applied across members 35 and 37 so as to adjustably deflect the head support assembly. If the polarity of this electric field is reversed, the direction in which the assembly bends, or deflects, correspondingly is reversed.

The support assembly comprised of the pair of piezo-electric leaf members having respectively opposite surfaces plated with electrodes hereinafter is referred to as a bi-morph leaf or bi-morph assembly.

Figure 7C:
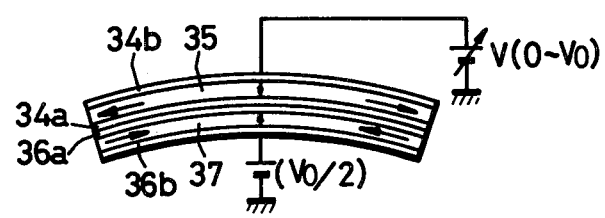

If the direction of polarization of the piezo-electric members is made opposite to each other, that is, if electrode 34a of leaf member 35 now contacts electrode 36a of leafmember 37, the manner in which voltage is applied to the bi-morph assembly to effect a displacement thereof is as shown in FIG. 7C. Hence, a voltage need not be applied to the electrodes which are in common contact with each other, as was necessary in the FIG. 7B embodiment. Instead, if a bias voltage, for example, a bias voltage $V_o/2$ is applied to electrode 36b, then the illustrated bi-morph assembly will bend in a downward direction if the variable voltage V is less than the bias voltage $V_o/2$. Conversely, the bi-morph assembly will bend in an upward direction if variable voltage V exceeds bias voltage $V_o/2$. It can be assumed that the variable voltage V is variable over a range from zero to $V_o$, volts.

Returning to FIGS. 6A and 6B, the bi-morph assembly $B_1$ (or $B_2$) of the type shown in FIG. 7C, is secured to mounting base 38 by a suitable adhesive 39. The bi-morph assembly extends outward from the base toward the periphery of guide from drum 18a, and magnetic head 17a or 17b is mounted on the free end of the bi-morph assembly.

Preferably, damping members 41a and 41b are provided to damp free or resonant oscillation of the bi-morph assembly which may be caused by the forces exerted in response to the bending voltages applied to the respective electrodes. Damping members 41a and 41b are attached to tabs 40a and 40b, respectively, these tabs extending from a damping member mounting plate 42 which, as shown, extends outwardly from base 38. Damping action is achieved when the damping members are pressed between the sides of the bi-morph assembly and tabs 40a and 40b with suitable force to prevent oscillation but not so great as to prevent deflection of the bi-morph assembly in response to the drive voltage applied thereto. As also shown, conducting leads are secured to the respective electrodes of the bi-morph assembly for receiving the drive or deflecting voltage so as to deflect heads 17a and 17b in the direction illustrated by the arrow shown in FIG. 6A. It will be appreciated that when this bi-morph assembly is used to scan tracks of the type shown in FIG. 1, the deflection of the heads 17a and 17b in response to the drive voltage applied to the bi-morph assembly results in movement of the heads transversely of the longitudinal axis of the illustrated record tracks.

Figure 8A:
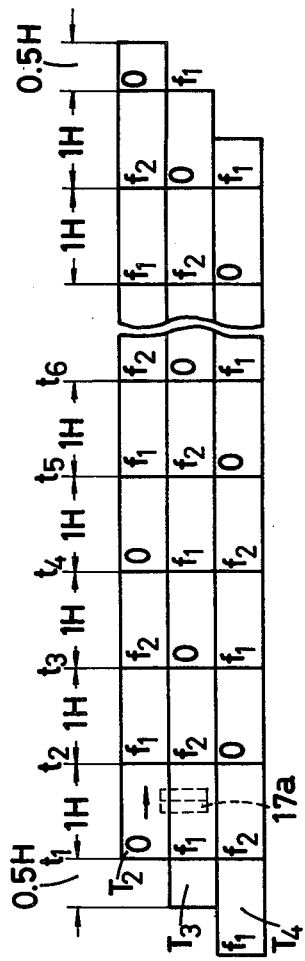

Returning now to the apparatus shown in FIG. 5, the operation thereof now will be described in conjunction with the waveform diagrams shown in FIGS. 8A–8E. FIG. 8A represents a portion of three tracks $T_2$, $T_3$ and $T_4$ recorded on tape 1 which are scanned by, for example, head 17a. Although the gap length of head 17a may be greater than the width of each record track as aforementioned, let it be assumed that this gap length is approximately equal to the width of a track. Let it be further assumed that head 17a is intended to scan track $T_3$, as illustrated in FIG. 8A. Successive horizontal line intervals 1H are recorded in each track, and the beginning portion of one track, for example, track $T_2$, is shifted relative to the beginning portion of adjacent track $T_3$ by an amount equal to one-half of a horizontal line interval (0.5H). This is attained by suitably selecting the diameter of tape guide drum 18, by suitably selecting the transport speed of the magnetic tape, or by selecting other parameters in the VTR, as is well known. With this displacement of one-half of a horizontal line interval, the parallel tracks are recorded with their horizontal blanking intervals aligned with each other in a direction transversely of the tracks. This is the so-called H-alignment. Thus, horizontal blanking intervals for tracks $T_2$, $T_3$ and $T_4$ are recorded at times $t_1$, $t_2$, $t_3$, . . . It is recalled that the respective pilot signals of frequencies zero, $f_1$ and $f_2$ are recorded at these times $t_1$, $t_2$, . . . Also, these pilot frequencies are recorded in a cyclical, repetitive arrangement, as shown.

If the scanning trace of head 17a coincides with track $T_3$, substantially equal cross-talk components will be picked up by this head from adjacent tracks $T_2$ and $T_4$. However, if there is a tracking error, the cross-talk component picked up from one adjacent track will have a greater signal level than the cross-talk component picked up from another adjacent track. As an example, if the scanning trace of head 17a deviates from track $T_3$ in the direction toward adjacent track $T_2$, as shown in FIG. 8A, then the cross-talk components picked up from track $T_2$, and particularly the cross-talk components of the pilot signals recorded in track $T_2$, are greater than the cross-talk components picked up from track $T_4$. Of course, the reproduced signals having the greatest signal level will be those picked up from the scanned track $T_3$. FIG. 8B represents the signal level at the output of band-pass filter 22 as head 17a traverses track $T_3$. In a similar fashion, FIG. 8C represents the signal level at the output of band-pass filter 23. Thus, at time $t_1$, pilot signal of frequency $f_1$ is recorded in track $T_3$, and the reproduced pilot signal has the highest level shown in FIG. 8B. At this time, the cross-talk component picked up from track $T_4$ is of a minimum level, and the output of band-pass filter 23 is as shown at time $t_1$ in FIG. 8C. At time $t_2$, the output of band-pass filter 23 is a maximum because the pilot signal of frequency $f_2$ is reproduced from track $T_3$, and the output of band-pass filter 22 corresponds to the relatively high cross-talk component of pilot signal having a frequency $f_1$, as recorded in track $T_2$. At time $t_3$, the pilot signal of zero frequency is recorded in track $T_3$. The pilot signal of frequency $f_2$ is recorded in track $T_2$, and output of band-pass filter 23 is of a relatively higher level than the output of band-pass filter 22 because of the greater cross-talk component picked up from track $T_2$ than from track $T_4$ wherein the pilot signal of frequency $f_1$ is recorded at this time. As head 17a continues to scan track $T_3$, the outputs of band-pass filters 22 and 23 are as shown in FIGS. 8B and 8C, which are repetitive of the outputs of these band-pass filters at times $t_1$, $t_2$ and $t_3$, respectively.

The threshold level associated with level discriminator 28 is greater than signal level $h_2$. Thus, at time $t_1$ when the output of band-pass filter 23 and level detector 25 has a magnitude $h_1$, level discriminator 28 is not activated. Similarly, at time $t_3$ when the output of band-pass filter 23 and level detector 25 has a magnitude $h_2$, level discriminator 28 also is not activated. However, at time $t_2$, the pilot signal of frequency $f_2$ is recorded in the scanned track $T_3$, and the output of band-pass filter 23 and level detector 25 has a magnitude which exceeds the threshold level associated with level discriminator 28. Consequently, the level discriminator is activated so as to trigger monostable multivibrator 29. The output pulse produced by this monostable multivibrator is shown in FIG. 8D and has a duration approximately equal to one horizontal line interval 1H. At the completion of the pulse produced by monostable multivibrator 29, that is, at the trailing edge thereof, monostable multivibrator 30 is triggered to produce the gate pulses shown in FIG. 8E. As may be appreciated, these gate pulses are produced during the horizontal blanking interval which immediately follows the horizontal blanking interval during which the pilot signal of frequency $f_2$ was recorded in track $T_3$. That is, this gate pulse is produced at a time when the pilot signal of zero frequency is recorded in track $T_3$.

Gate circuits 26 and 27 are energized by the gate pulses shown in FIG. 8E to supply to hold circuits 31 and 32 the signal levels which then are detected by level detectors 24 and 25. Hence, gate circuit 26 supplies to hold circuit 31 the signal level $h_1$ which is the signal level of the cross-talk component of the pilot signal having the frequency $f_1$ which is recorded in track $T_4$. Gate circuit 27 supplies to hold circuit 32 the signal level $h_2$ which corresponds to the level of the cross-talk component of the pilot signal whose frequency is $f_2$ and which is recorded in track $T_2$. Signal level $h_2$ exceeds signal level $h_1$ because it has been assumed that head 17a deviates from track $T_3$ in the illustrated direction. Since signal level $h_2$ exceeds signal level $h_1$, control signal generator 33 produces a drive voltage at output terminal 33a which is proportional to this difference. This drive voltage is applied to the bi-morph assembly upon which head 17a is mounted so as to deflect the bi-morph assembly in a direction to restore the scanning trace of head 17a into coincidence with track $T_3$. Thus, the amplitude of this drive voltage is proportional to the tracking error deviation, and its polarity is suitable to deflect the bi-morph assembly in a direction to move head 17a into coincidence with track $T_3$.

If the tracking error of head 17a is such that its scanning trace deviated from track $T_3$ in the downward direction such that the cross-talk components picked up from track $T_4$ exceeded the cross-talk components picked up from track $T_2$, it is appreciated that at time $t_3$, signal level $h_1$ would have been greater than signal level $h_2$. Consequently, gate circuits 26 and 27 would be energized by the gate pulse shown in FIG. 8E to apply signal levels $h_1$ and $h_2$, respectively, to hold circuits 31 and 32. The drive voltage produced by control signal generator 33 in response to these signal levels would have an amplitude and polarity so as to deflect the bi-morph assembly in a direction to return the scanning trace of head 17a into coincidence with track $T_3$. That is, when viewed in FIG. 8A, head 17a would be displaced in an upward direction.

It will be appreciated that a 1H delay in producing the gate pulses shown in FIG. 8E is advantageous because, at the time that these gate pulses are produced, the pilot signal recorded in the scanned track $T_3$ has a zero frequency. Hence, the problem of cross-talk interference between the pilot signal recorded in track $T_3$ and the pilot signals recorded in tracks $T_2$ and $T_4$ is avoided. By utilizing level discriminator 28 and monostable multivibrators 29 and 30, the cross-talk components of the pilot signals recorded in adjacent tracks are detected at a time when interference, such as beat interference, with the pilot signal recorded in the track being scanned will be minimized. If a pilot signal of one frequency is recorded in each horizontal blanking interval in track $T_2$, and if a pilot signal of another frequency is recorded in each horizontal blanking interval in track $T_3$, and if a pilot signal of yet another frequency is recorded in each horizontal blanking interval in track $T_4$, there is the possibility that the cross-talk component of the pilot signal picked up from track $T_2$ may interfere with the pilot signal which is picked up from track $T_3$, thereby resulting in an erroneous signal level detection. This same problem may occur due to interference between the cross-talk component of the pilot signal picked up from track $T_4$ and the pilot signal reproduced from track $T_3$. This problem is substantially avoided by providing a pilot signal of zero frequency in the track being scanned at the time that the pilot signals in adjacent tracks are detected.

Figure 9:
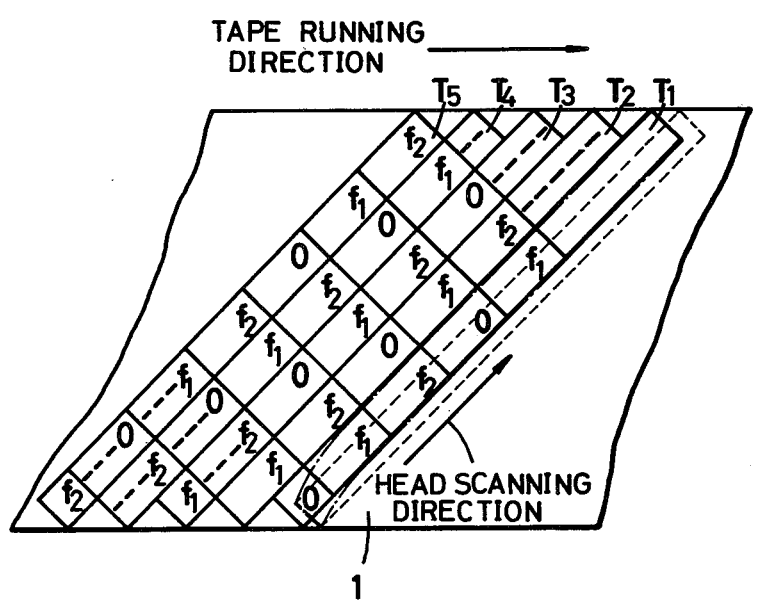
FIG. 9 represents scanning errors in a transducer which scans a pattern of parallel record tracks, and is useful in understanding the advantageous result achieved by the present invention.

While the aforedescribed apparatus provides satisfactory tracking-error correction, it is recognized that this correction is achieved only while the head, such as head 17a, scans a track. No drive signals are applied to the bi-morph assembly for head 17a when this head is out of contact with tape 1. That is, for the interval that head 17a is not scanning the tape, the bi-morph assembly will return to its normal, quiescent position. This normal position may differ from the desired scanning trace of head 17a. An example of this is shown in FIG. 9 wherein the broken line represents the scanning trace of head 17a when its bi-morph assembly assumes the aforementioned normal position. Thus, a correction operation must be carried out during the initial portion of the scanning trace of head 17a immediately following the movement of this head into reproducing relation with respect to tape 1. Since this correction operation requires a given time interval, a tracking error will be present during the initial scanning trace of the head, as represented by the one-dot chain line shown in FIG. 9. This finite response time means that the top portion of the reproduced video picture may exhibit some undesired deterioration. Also, there is the possibility that the tracking-error correcting apparatus shown in FIG. 5 may introduce some "hunting" of the head about the track being scanned thereby.

Figure 10:
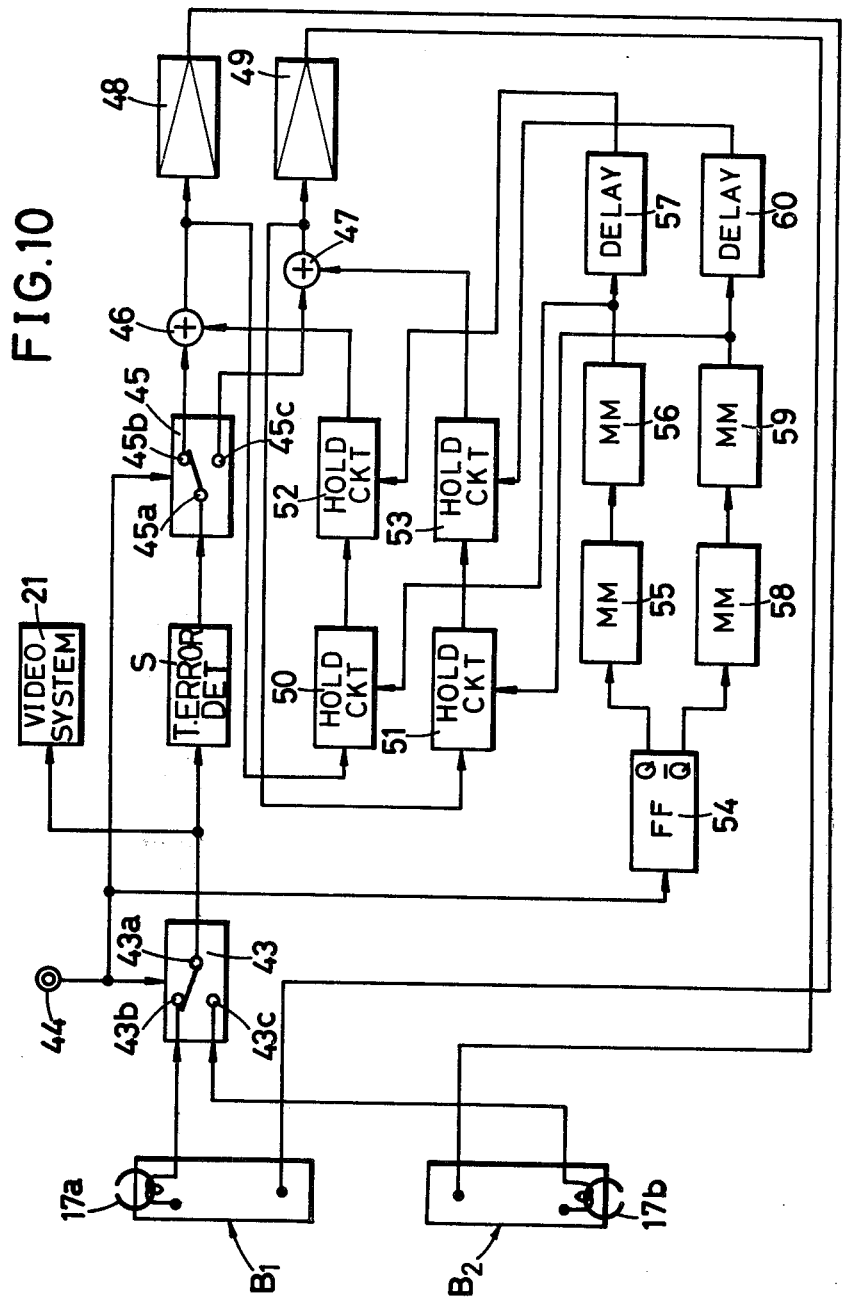
FIG. 10 is a block diagram of one embodiment of apparatus in accordance with the present invention.

The aforenoted problems, and particularly the initial delay in bringing the scanning trace of the head into coincidence with the track being scanned, are avoided by the apparatus shown in FIG. 10. One general purpose of this apparatus is to predisplace head 17a, and also head 17b, prior to the time that the head begins to scan tape 1. If this pre-displacement is approximately equal to the actual displacement needed for coincidence between the scanning trace of the head and the track being scanned, then the final adjustment of the position of the head will require only a minimum amount of time.

In the embodiment shown in FIG. 10, bi-morph assemblies $B_1$ and $B_2$ may be of the type shown in FIGS. 6A and 6B, with heads 17a and 17b mounted thereon. These heads are coupled to a change-over switching circuit 43 having a change-over control input coupled to an input terminal 44. The output of change-over switching circuit 43 is coupled to a video system 21, such as the video system shown in FIG. 5, and also to a tracking error detecting system S, which may be of the type also shown in FIG. 5. The output of tracking error detecting system S is coupled through a change-over switching 45 to adding circuits 46 and 47, these adding circuits being further coupled to amplifiers 48 and 49, respectively, to bi-morph assemblies $B_1$ and $B_2$. Change-over switching circuit 45 includes a change-over control input coupled to an input terminal 44. This input terminal is adapted to receive the head-position detecting pulses which are produced by head-position generator 19c, shown in FIG. 4B. Thus, change-over switching circuits 43 and 45 are activated when each head rotates into position to begin its scan of record medium 1. While these change-over switching circuits may be formed of solid-state switching devices, these switching circuits are illustrated schematically as including a movable contact selectively engageable with one or the other of a pair of stationary contacts. Thus, change-over switching circuit 43 is shown to include movable contact 43a which is selectively engageable either with contact 43b to which head 17a is connected, or with contact 43c to which head 17b is connected. Change-over switching circuit 45 is shown to include movable contact 45a which is selectively engageable either with contact 45b to complete a circuit therethrough to adding circuit 46, or with contact 45c to complete a circuit therethrough to adding circuit 47. When head 17a scans tape 1, change-over switching circuits 43 and 45 are activated so that movable contacts 43a and 45a engage contacts 43b and 45b, respectively. When head 17b moves into contact with tape 1, a head-position detecting pulse applied to input terminal 44 activates the changeover switching circuits so that movable contacts 43 and 45a engage contacts 43c and 45c, respectively.

With the change-over switching circuits 43 and 45, tracking error detecting system S, adding circuits 46 and 47 and amplifiers 48 and 49, as thus far described, it is appreciated that when head 17a scans tape 1, the signals reproduced by this head are utilized by tracking error detecting system S so as to produce a drive voltage which is applied through change-over switching circuit 45, adding circuit 46 and amplifier 48 to bi-morph assembly $B_1$ so as to deflect head 17a in a direction to bring this head into coincidence with the track being scanned. During the scanning of the next adjacent record track, head 17a is out of contact with tape 1 and head 17b now scans this tape. The signals reproduced by this head are supplied through change-over switching circuit 43 to tracking error detecting system S, the latter system producing a drive voltage which is supplied through change-over switching circuit 45, adding circuit 47 and amplifier 49 to bi-morph assembly $B_2$ so as to deflect head 17b in a direction to bring it into coincidence with the track being scanned. This operation has been described previously in conjunction with the embodiment shown in FIG. 5.

FIG. 10 also includes a sample-and-hold device coupled to the outputs of adding circuits 46 and 47 and supplied with sampling pulses by a sampling pulse generating circuit for the purpose of sampling and storing the drive voltages which are produced by tracking error detecting system S during the respective scans of tape 1 by heads 17a and 17b. The sample-and-hold device is comprised of sample-and-hold circuits 50 and 51 having input terminals coupled to the outputs of adding circuits 46 and 47, respectively, and sample-and-hold circuits 52 and 53 which are coupled to sample-and-hold circuits 50 and 51, respectively. The outputs of sample-and-hold circuits 52 and 53 are coupled to adding circuits 46 and 47, respectively.

The sampling pulse generating circuit includes a flip-flop circuit 54 having an input coupled to input terminal 44 and adapted to change its state in response to each successive position detecting pulse applied to input terminal 44. Flip-flop circuit 54 includes complementary outputs Q and $\overline{Q}$ coupled to monostable multivibrators 55 and 58, respectively. These monostable multivibrators are, in turn, coupled to monostable multivibrators 56 and 59, respectively. These latter monostable multivibrators produce sampling pulses which are applied to sample-and-hold circuits 50 and 51, respectively, and, moreover, are supplied to delay circuits 57 and 60 for delaying these sampling pulses and for supplying the delayed sampling pulses to sample-and-hold circuits 52 and 53, respectively.

The operation of the embodiment shown in FIG. 10 now will be described in conjunction with the waveform diagrams in FIGS. 11A–11P. With respect to FIG. 11A, the intervals $b_1$, $a_1$, $b_2$, . . . represent the successive traces scanned by heads 17b and 17a, respectively. That is, head 17b scans trace $b_1$, then head 17a scans trace $a_1$, then head 17b scans trace $b_2$, and so on. In a typical VTR, each track contains a complete field of video signals. Hence, the field intervals v correspond with the successive traces scanned by the heads. As may be appreciated, the position detecting pulses produced by head-position detector 19c exhibit the field frequency and are separated by intervals v, as shown in FIG. 11B. These position detecting pulses are received at input terminal 44 and supplied to change-over switching circuits 43 and 45 and also to flip-flop circuit 54. The state of this flip-flop circuit changes in response to each position detecting pulse such that output pulses $Q_o$ (FIG. 11C) are produced at the Q output of flip-flop circuit 54, and output pulses $\overline{Q}_o$ (FIG. 11D) are produced at the $\overline{Q}$ output of this flip-flop circuit.

Monostable multivibrator 55 is triggered in response to the positive transitions of output pulses $Q_o$; and monostable multivibrator 58 is triggered in response to the positive transitions in the output pulses $\overline{Q}_o$. Thus, monostable multivibrator 55 generates pulses 55a, shown in FIG. 11E, these pulses being produced at the start of each scan by head 17a and having a period equal to twice the field interval. Similarly, monostable multivibrator 58 generates pulses 58a, shown in FIG. 11H, these pulses coinciding with the start of each scan by head 17b and having a period equal to twice the field interval. The negative transitions in pulses 55a and 58a trigger monostable multivibrators 56 and 59, respectively, to produce sampling pulses 56a and 59a, as shown in FIGS. 11F and 11I. The sampling pulses 56a and 59a are supplied to sample-and-hold circuits 50 and 51, respectively, such that these sample-and-hold circuits sample the outputs of adding circuits 46 and 47, respectively. Sampling pulses 56a and 59a also are supplied through delay circuits 57 and 60, respectively, whereby these sampling pulses are delayed by a time substantially equal to a field interval. The delayed sampling pulses 57a and 60a (FIGS. 11G and 11J) are supplied to sample-and-hold circuits 52 and 53, respectively, for enabling these sample-and-hold circuits to sample the signals which then are stored in sample-and-hold circuits 50 and 51.

Let it be assumed that head 17a scans tape 1 during interval $a_1$. During this scanning interval, tracking error detecting system S produces a control signal, previously referred to as the drive voltage, shown as signal $S_{a1}$ in FIG. 11M. This drive voltage is supplied by the tracking error and detecting system through change-over switching circuit 45 and adding circuit 46 to amplifier 48 for application to bi-morph assembly $B_1$. At the sample time determined by sampling pulses 56a, drive voltage $S_{a1}$ is sampled. It is appreciated that this drive voltage is sampled at a time delayed from the start of scanning interval $a_1$, as determined by the time constant of monostable multivibrator 55. Preferably, this delayed sampling time is selected so that if there is any initial deviation between the scanning trace traversed by head 17a and the track being scanned, this initial deviation has been substantially removed by the time that sampline pulse 56a is generated. It is assumed that the sample of drive voltage $S_{a1}$ by sampling pulse 56a has an amplitude $V_1$, and this sampled drive voltage $V_1$ is stored in the storage section of sample-and-hold circuit 50, as represented in FIG. 11K.

The stored sample voltage $V_1$ then is sampled by sample-and-hold circuit 52 in response to delayed sampling pulse 57a. Sampled voltage $V_1$ then is stored in the storage section of sample-and-hold circuit 52, as shown in FIG. 11L, and this stored sample $V_1$ is applied via adding circuit 46 and amplifier 48 to bi-morph assembly $B_1$ as a drive voltage therefor. Consequently, during most of the interval $b_2$ that head 17a is not in contact with tape 1, drive voltage $V_1$ is applied to the bi-morph assembly, as shown in FIG. 11M, to displace the head to a position that approximates the position of the track which had been scanned previously thereby and, therefore, which closely approximates the position of the next track which will be scanned by head 17a during interval $a_2$.

At the beginning of interval $a_2$, head 17a moves into contact with tape 1 so as to exhibit a reproducing relation with respect to the tape. Since the drive voltage $V_1$ is applied to bi-morph assembly $B_1$ immediately prior to the start of interval $a_2$, it is appreciated that the beginning of the scanning trace traversed by head 17a approximately coincides with the next track which is scanned thereby. Consequently, the tracking error detected by tracking error detecting system S is relatively small, and the drive voltage generated thereby also is correspondingly small. Thus, only a very brief delay, if any, is present until head 17a reaches coincidence with the track which it scans.

As before, at a delayed time following the start of scanning interval $a_2$, sampling pulse 56a is generated and drive voltage $S_{a2}$ (FIG. 11M) now produced by tracking error detecting system S is sampled. This sampled drive voltage, represented as sample $V_2$, is stored in the storage section of sample-and-hold circuit 50 (as shown in FIG. 11K); and this sampled voltage $V_2$ is sampled by sample-and-hold circuit 52 in response to delayed sampling pulse 57a (FIG. 11G). At that time, the sample $V_1$ which had been stored in the storage section of sample-and-hold circuit 52 is replaced by sample $V_2$. Therefore, as shown in FIG. 11M, the drive voltage which is applied to bi-morph assembly $B_1$ during the time between the end of scanning interval $a_2$ and the generation of delayed sampling pulse 57a is equal to sample $V_1$ which still is stored in the storage section of sample-and-hold circuit 52.

The control over head 17b and its bi-morph assembly $B_2$ is substantially the same as that described above with respect to head 17a and its bi-morph assembly $B_1$. Thus, when head 17b scans tape 1 during interval $b_1$, tracking error detecting system S produces drive voltage $S_{b1}$ (FIG. 11P), and this drive voltage is applied through change-over switching circuit 45, adding circuit 47 and amplifier 49 to bi-morph assembly $B_2$. This drive voltage also is applied to sample-and-hold circuit 51, and at the sample time determined by sampling pulse 59a, the drive voltage is sampled. The sampled voltage $V_3$ (FIG. 11N) is stored in the storage section of sample-and-hold circuit 51; and during scanning interval $a_1$, that is, when head 17b no longer is in contact with tape 1, delayed sampling pulse 60a energizes sample-and-hold circuit 53 to sample the stored sample $V_3$. Thus, at the sample time determined by delayed sampling pulse 60a, sample voltage $V_3$ is stored in the storage section of sample-and-hold circuit 53, as shown in FIG. 11O. This stored sample $V_3$ also is supplied from the sample-and-hold circuit through adding circuit 47 and amplifier 49 as a drive voltage for bi-morph assembly $B_2$. This drive voltage $V_3$ thus is applied during the interval that head 17b does not scan tape 1, thereby predisplacing the head so that it will arrive in contact with tape 1 in approximate coincidence with the next track which is scanned thereby.

During the next scanning interval $b_2$, a drive voltage $S_{b2}$ is produced by tracking error detecting system S, as shown in FIG. 11P. This drive voltage not only controls the scanning trace traversed by head 17b, but it is sampled at a time determined by sampling pulse 59a. This sample $V_4$ is stored in sample-and-hold circuit 51, and when head 17b departs from tape 1, sample-and-hold circuit 53 is activated so as to sample and store this sample $V_4$. During scanning interval $a_2$ when head 17b is not in contact with the tape, the stored sample $V_4$ is applied as a pre-displacing drive voltage.

In the foregoing description, it is assumed that the VTR is provided with two scanning heads 17a and 17b. However, the foregoing description is equally applicable to an embodiment wherein only a single scanning head is used, or wherein more than two scanning heads are provided. Also, it has been assumed that each of the illustrated sample-and-hold circuits is inoperative to store a sampled drive voltage for a period equal to two scanning, or field intervals. However, it is contemplated that, if desired, each sample-and-hold circuit may be cleared immediately after a single field interval. For example, sample-and-hold circuit 50 may be cleared after the sampled voltage stored therein is sampled and stored in sample-and-hold circuit 52. Also, sample-and-hold circuit 52 may be cleared after head 17a begins its next scanning trace. Thus, in the aforedescribed embodiment, the sampled voltage stored in the storage section of sample-and-hold circuit 52 is applied to adding circuit 46, and thus to bi-morph assembly $B_1$, both prior to and during a scanning trace of head 17a. In an alternative embodiment, the sampled voltage may be applied to adding circuit 46, and thus to bi-morph assembly $B_1$, only during the interval that head 17a is not in contact with tape 1, thereby merely pre-displacing the head. This alternative embodiment also is applicable to sample-an-hold circuit 53 and head 17b.

In yet another alternative, the control voltage produced when one head scans tape 1 can be sampled and used as a predisplacing control voltage for the other head which then is not in contact with the tape. For example, sample $V_1$, which is produced during interval $a_1$ when head 17a scans tape 1, may be applied directly by sample-and-hold circuit 50 to adding circuit 57 as a control voltage for bi-morph assembly $B_2$ during this interval $a_1$ that head 17b is not in contact with the tape. Similarly, during the next scanning interval $b_2$, the sample $V_4$ produced by sample-and-hold circuit 51 may be applied directly to adding circuit 46 as a drive voltage for bi-morph assembly $B_1$ during this interval that head 17a is not in contact with tape 1. In this alternative, sample-and-hold circuits 52 and 53 may be omitted.

While the present invention has been particularly shown and described with reference to preferred embodiments and applications thereof, it should be readily apparent to one of ordinary skill in the art that various other modifications in form and details may be made without departing from the spirit and scope of the invention. For example, tracking error detecting system S need not be limited strictly to the embodiment shown in FIG. 5. Other constructions of such a system can be used, such as one wherein pilot signals of equal frequency are recorded in each horizontal blanking interval, but the horizontal blanking intervals of one track are displaced with respect to the horizontal blanking intervals in both adjacent tracks. Also, although the bi-morph assembly is preferred for the head support assembly, other adjustable head support structures can be used, if desired. Furthermore, delay circuits 57 and 60 may exhibit a delay which is less than a field interval. Hence, delayed sampling pulses 57a and 60a may be produced at approximately the time that heads 17a and 17b, respectively, complete their scanning traces of tape 1. That is, delayed sampling pulse 57a may coincide with the start of interval $b_1, b_2, \ldots$; and delayed sampling pulse 60a may coincide with the start of scanning interval $a_1, a_2, \ldots$ Still further, apparatus may be provided wherein heads 17a and 17b are intentionally deflected by a small amount and sinusoidally while scanning each record track so as to provide a dithering effect for obtaining good signal reproduction.

It is intended that the appended claims be interpreted as including all of the aforedescribed changes and modifications, as well as various other similar changes and modifications which will become apparent to one of ordinary skill in the art.

What is claimed is:

1. Tracking control apparatus for a signal reproducing system of the type wherein at least one transducer scans successive parallel tracks on a record medium in which information signals are recorded, said apparatus comprising:

transducer means adapted for relative movement into a reproducing relation with respect to said record medium for reproducing the signals recorded in a given track;

detecting means for detecting a deviation between the scanning trace of said transducer means across said record medium and said given track and for producing a control signal as a function of said detected deviation;

adjustable support means for said transducer means, said adjustable support means being responsive to said control signal to displace said transducer means transversely of said given track in accordance with said control signal;

means for storing a predetermined sample of the control signal produced while said transducer means scans said given track; and means for supplying said predetermined sample to said adjustable support means prior to the time that said transducer means moves into a subsequent reproducing relation with respect to said record medium so that said transducer means is pre-displaced before signals are next reproduced thereby.

2. The apparatus of claim 1 wherein said means for supplying comprises combining means coupled to said detecting means and to said storing means for continuing to supply said predetermined sample to said transducer means while said transducer means scans the next track on said record medium.

3. The apparatus of claim 1 wherein said transducer means comprises at least one rotary transducer which does not reproduce signals from said record medium during a portion of its rotary movement; and wherein said storing means comprises sample and hold means for sampling said control signal when said rotary transducer has advanced beyond a minimum distance along said given track, and means for applying said sampled control signal to said supplying means when said rotary transducer moves through said portion of its rotary movement during which signals are not reproduced thereby.

4. The apparatus of claim 3 wherein said storing means further comprises sensing means for sensing when said rotary transducer commences to scan said record medium and completes its scan of said record medium; and sample pulse generating means for generating sample pulses at predetermined times after said rotary transducer commences and completes its scan of said record medium.

5. The apparatus of claim 4 wherein said sample and hold means comprises a first sample and hold circuit responsive to a first sample pulse for sampling and storing said control signal at the predetermined time after said rotary transducer commences its scan of said record medium; and a second sample and hold circuit responsive to a second sample pulse for sampling the sampled control signal stored in said first sample and hold circuit at the predetermined time after said rotary transducer completes its scan of said record medium; whereby the sampled control signal stored in said second sample and hold circuit is applied to said supplying means.

6. The apparatus of claim 5 wherei said means for supplying comprises adding means for adding said control signal produced by said detecting means and said sampled control signal stored in said second sample and hold circuit and to apply the added signals to said adjustable support means.

7. The apparatus of claim 1 wherein said transducer means comprises first and second rotary transducers for scanning alternate tracks, respectively, to reproduce the signals recorded in said alternate tracks; and wherein said adjustable support means comprises first and second adjustable transducer support assemblies, respectively, each being responsive to said control signal and to a sample of said control signal so as to displace its transducer both before and during the scanning of said record medium thereby.

8. The apparatus of claim 7 wherein said storing means comprises first and second sample and hold means for producing a first sample of said control signal when said first rotary transducer has advanced beyond a minimum distance along each track scanned thereby and a second sample of said control signal when said second rotary transducer has advanced beyond a minimum distance along each track scanned thereby, respectively; and said supplying means comprises means for supplying said first sample of said control signal to said second adjustable support assembly at least during the time that said second transducer does not scan a track, and means for supplying said second sample of said control signal to said first adjustable transducer support assembly at least during the time that said first transducer does not scan a track.

9. The apparatus of claim 8 wherein said supplying means further comprises first adding means for adding said control signal produced by said detecting means and said first sample of said control signal and to apply the added signals to said second adjustable transducer support assembly; and second adding means for adding said control signal produced by said detecting means and said second sample of said control signal and to apply the added signals to said first adjustable transducer support assembly.

10. The apparatus of claim 1 wherein said information signals include predetermined signals recorded in each track; and wherein said detecting means comprises means for detecting the levels of the cross-talk components of said predetermined signals reproduced by said transducer means from adjacent tracks while said transducer means scans said given track and for producing said control signal as a function of said detected cross-talk levels.

11. The apparatus of claim 10 wherein said predetermined signals are pilot signals of different frequencies recorded in predetermined locations in said tracks; and wherein said means for detecting the levels of cross-talk components of said predetermined signals comprises means for sampling the signals reproduced by said transducer means at sample times coinciding with the occurrence of said pilot signals, first means for producing a first signal proportional to the level of the cross-talk component of a sampled pilot signal of a first frequency picked up from a first track adjacent said given track, second means for producing a second signal proportional to the level of the cross-talk component of a sampled pilot signal of a second frequency picked up from a second track adjacent said given tack, and comparator means for producing said control signal as a function of the difference between said first and second signals.

12. The apparatus of claim 11 wherein said information signals are video signals having plural line intervals recorded in each track, said pilot signals being recorded with equal amplitudes during the horizontal blanking intervals of said video signals, and said different frequencies comprising a zero frequency, frequency $f_1$ and frequency $f_2$ recorded in order and repetitively in successive horizontal blanking intervals of a track with the frequency of the pilot signal recorded in a horizontal blanking interval in said given track being different from each of the frequencies recorded in the adjacent horizontal blanking interval of each of the adjacent tracks; and wherein said means for sampling comprises gating means for passing pilot signals of frequencies $f_1$ and $f_2$, respectively, in response to gating pulses applied thereto; means for detecting when said transducer means reproduces a pilot signal of one of said frequencies $f_1$ and $f_2$ having an amplitude which exceeds a threshold level; means for generating said gating pulses at a time subsequent to the reproduction of said pilot signal which exceeds said threshold level so that each gating pulse coincides with the reproduction of said zero frequency pilot signal from said given track; and frequency sensitive means for supplying signals representing the amplitudes of reproduced cross-talk components of pilot signals of frequencies $f_1$ and $f_2$ to said gating means.

13. The apparatus of claim 1 wherein said storing means stores said sample of the control signal for a duration equal to the time in which said transducer means scans two tracks; and wherein said transducer means comprises two reproducing heads for scanning alternate tracks on said record medium.

14. The apparatus of claim 1 wherein said transducer means comprises a magnetic head; and said adjustable support means comprises electrically responsive flexure means upon which said head is mounted, said flexure means flexing in response to said control signal and to said predetermined sample to displace said head in a direction perpendicular to the longitudinal direction of the track being scanned.

15. The apparatus of claim 14 wherein said flexure means is formed of piezo-electric material.

16. The apparatus of claim 15 wherein said piezo-electric material comprises a leaf assembly formed of two leaves of piezo-electric material, each having top and bottom surfaces provided with electrodes, the two leaves being in overlying relationship with each other.

* * * * *